United States Patent [19]
Roberts

[11] 4,237,446
[45] Dec. 2, 1980

[54] VEHICLE CLEARANCE DETECTOR

[76] Inventor: William L. Roberts, 2319 E. McArthur, Tempe, Ariz. 85281

[21] Appl. No.: 61,529

[22] Filed: Jul. 27, 1979

[51] Int. Cl.³ .................... G08B 21/00; H01H 3/16
[52] U.S. Cl. .............................. 340/61; 200/61.44
[58] Field of Search .............. 116/28 R; 340/61; 200/61.44

[56] References Cited

U.S. PATENT DOCUMENTS

| | | | |
|---|---|---|---|
| 2,214,685 | 9/1940 | Stone, Jr. | 340/61 |
| 2,812,397 | 11/1957 | Taylor | 200/61.44 |
| 2,957,059 | 10/1960 | Meredith | 200/61.44 |
| 3,232,265 | 2/1966 | Hurt | 116/28 R |
| 3,269,783 | 8/1966 | Kriz | 200/61.44 X |

Primary Examiner—Daniel M. Yasich
Attorney, Agent, or Firm—Tod R. Nissle

[57] ABSTRACT

An improved clearance detecting device for warning the driver of a vehicle of a impending obstruction. In a detecting device consisting of a base, an antenna, spring means connecting the base and antenna, and an electrical circuit with an alarm device and normally open switch means, the improvement consists of switch means comprising a contact surface and an elongate spring with two ends. One end of the spring is attached to the clearance detector device while the other end is responsive when the antenna is deflected to engage the contact surface so that the electrical circuit is closed and the alarm device activated.

1 Claim, 9 Drawing Figures

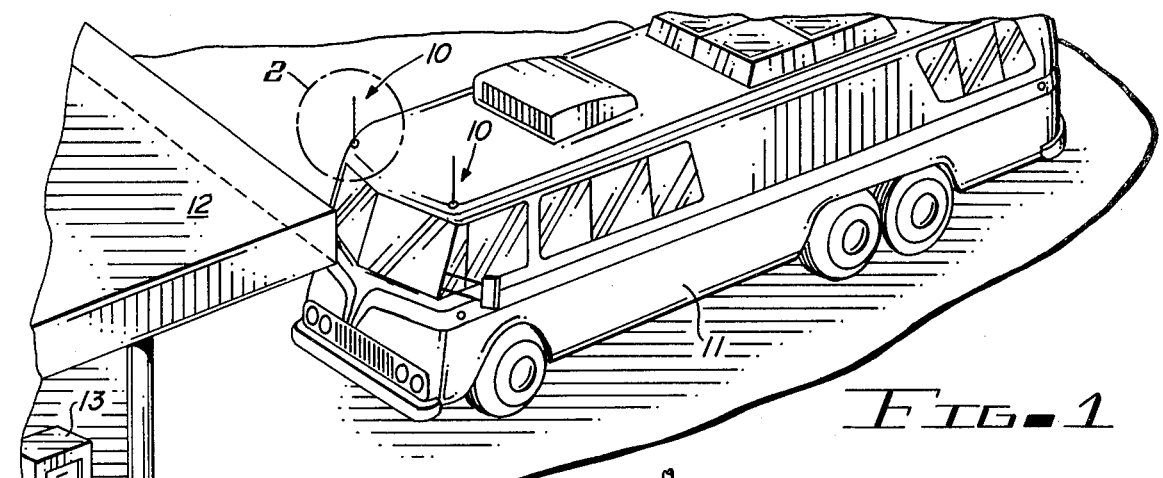
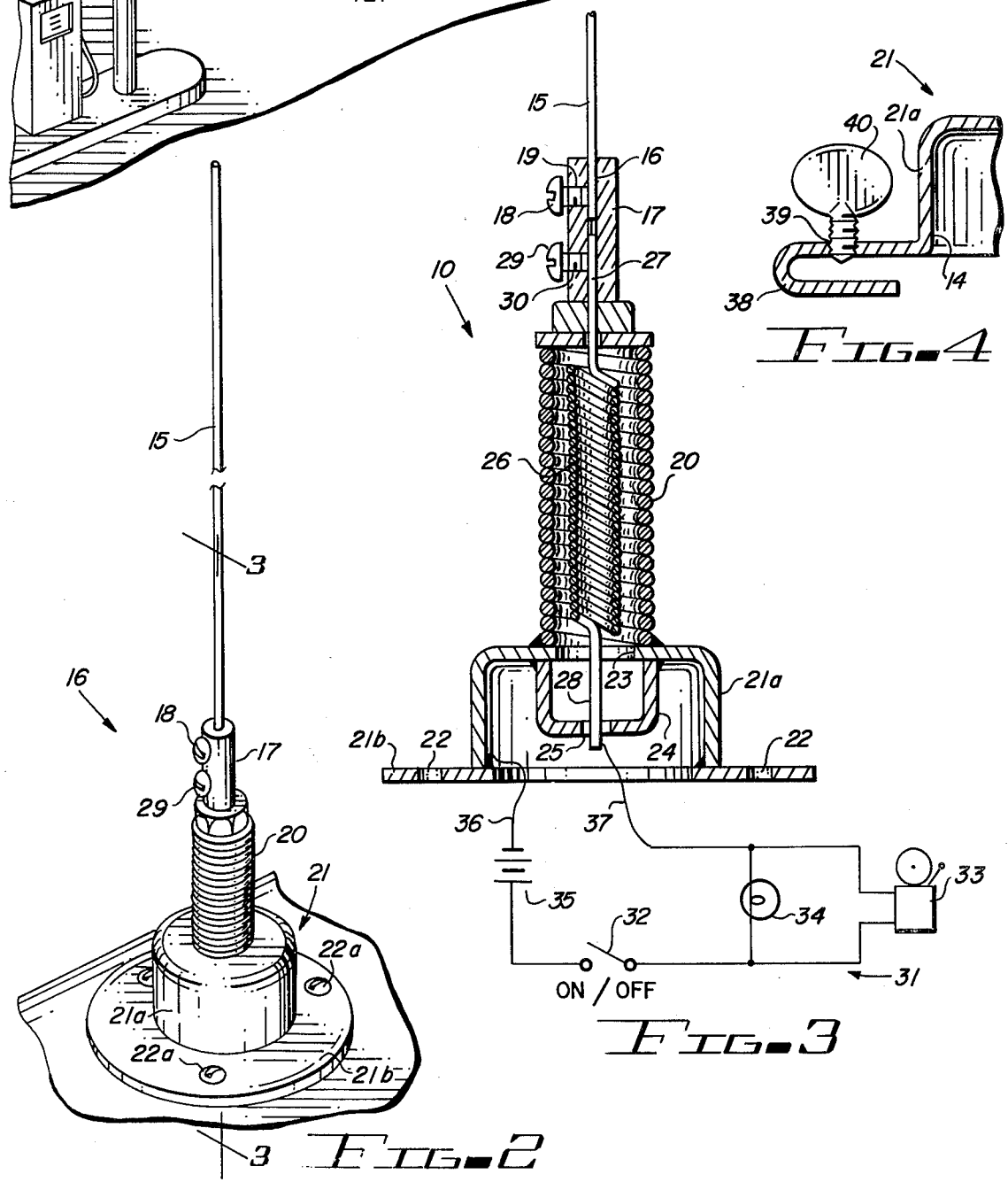

VEHICLE CLEARANCE DETECTOR

This invention relates to sensory and detector devices.

In another respect the invention pertains to improvements in clearance detection and warning devices for vehicles.

In yet another respect the invention pertains to improvements in detection devices for warning a vehicle approaching a structure when clearances are less than required for safe passage of the vehicle under or by the structure.

Clearance detector devices, in particular overhead clearance devices designed principally for trucks, are well-known in the art. For example, see U.S. Pat. Nos. 2,554,371 to Marx, 2,834,002 to Nordsiek, 2,902,671 to Pitt, 3,137,267 to Hurt, 3,232,265 to Hurt and 3,269,783 to Kriz. These prior art devices are essentially comprised of a deflectable antenna for contacting overhead obstructions, a base adapted to receive the antenna and to be mounted on the vehicle, and an alarm device. The alarm device is in electrical or mechanical communication with the antenna so that when the antenna is deflected on contacting an obstruction, the alarm warns the driver of the vehicle of the close proximity of the obstruction.

Although such prior art clearance detectors would seem of value in preventing damage to vehicles, observation has confirmed that the use of the above prior art clearance detectors has either been very limited or perhaps non-existent.

This minimal utilization has probably resulted because the prior art detectors are generally difficult to install, susceptible to damage, and overly complex and expensive in relation to the simple, infrequent function such devices are required to perform.

A principal disadvantage of known clearance detectors is that such detectors are susceptible to damage. If a vehicle driver were to contact an obstruction with the bracket structure supporting the antenna, many of the prior art detectors would be severely damaged if not destroyed. For example, in U.S. Pat. No. 3,137,267 to Hurt, if the tubular member identified by Reference No. 24 in FIG. 1 struck an obstruction, even with a truck traveling at a slow rate of speed, the detector device would probably be permanently damaged. In this regard see also U.S. Pat. Nos. 2,554,371 to Marx, 2,834,002 to Nordsiek, and 3,269,783 to Kriz.

Another disadvantage of prior art clearance detectors is that they are unnecessarily obtrusive. Practically speaking, a driver does not want the mechanical scale and pointer combination disclosed in U.S. Pat. No. 3,232,265 inside the vehicle impeding both the view from and the movement of passengers within the vehicle.

Many of the prior art clearance detectors are overly complicated in relation to the function they perform. In U.S. Pat. No. 3,269,783 to Kriz, a simple electrical alarm system is combined with two detector antennas, one antenna being shorter than the other, an air tank, connections to the front and rear brace, two blade springs and switches, and so on. In U.S. Pat. No. 2,834,002 to Nordsiek not two but three switches and three separate warning lights are provided in the alarm system. Past history has demonstrated that vehicle owners are generally not willing to pay for such complexity to perform the simple, infrequent task of being warned of impending obstructions.

Finally, the prior art clearance detectors each have been generally designed with a particular limited application in mind. For instance, certain of such devices are attached to the upper part or roof of a vehicle to warn of overhead obstructions. Other detector mechanisms are mounted on the fender of a vehicle to alert a driver of a nearby curve. Typically the overhead detector devices cannot be readily utilized as curb warning devices and vice versa. In addition, both the overhead and the curb detection devices are generally not designed for facile attachment to building constructions, for example, to an awning covering gasoline pumps, so that the driver of an approaching high-profile vehicle may be alerted when the vehicle would not safely pass underneath the awning.

To remedy the deficiencies of the prior art clearance detectors, described above, it would be highly advantageous to provide a structurally simple clearance detector which was durable in operation and had a minimal likelihood of being damaged in contacting obstructions.

It would also be highly desirable to provide a clearance detector which could be mounted and utilized on the roof or fender of a vehicle and on building constructions.

It would further be highly desirable to provide an improved clearance detector which was inexpensive to manufacture and sell.

In addition, it would also be highly desirable to provide an improved clearance detector which could be quickly and conveniently attached to existing vehicles and building constructions by relatively unskilled persons using only simple, conventional hand tools.

It is, therefore, a principal object of the present invention to provide an improved vehicle clearance detector.

Another object of the invention is to provide an improved clearance detector which would have a minimal likelihood of being damaged in contacting obstructions.

Yet another object of the invention is to provide an improved clearance detector which is structurally simple and durable and is inexpensive to manufacture and sell.

A further object of the invention is to provide a clearance detector which may be conveniently attached to and used on existing vehicles or building constructions.

Still another and further object of the invention is to provide an improved clearance detector which can be simply and readily attached to existing vehicles and building constructions by persons of limited mechanical skill using conventional, simple hand tools.

These and other, further and more specific objects and advantages of the invention will be apparent to those skilled in the art from the following detailed description thereof, taken in conjunction with the drawings, in which:

FIG. 1 is a perspective view of a vehicle with a clearance detector embodying the principals of the present invention mounted thereon;

FIG. 2 is a perspective view of the presently preferred embodiment of the invention;

FIG. 3 is a cross-sectional view of the clearance detector of FIG. 2 taken along section line 3—3 thereof;

FIG. 4 is a side cross-sectional view of an optional means for mounting the clearance detector of FIG. 3;

Figure 5:
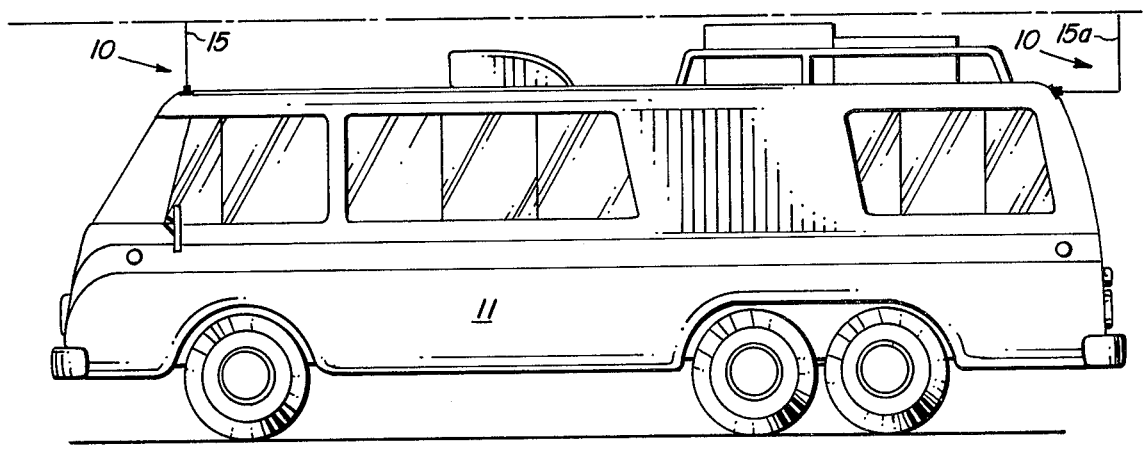
FIG. 5 is a side elevational view of a vehicle with embodiments of the present invention mounted thereon.
Figure 6:
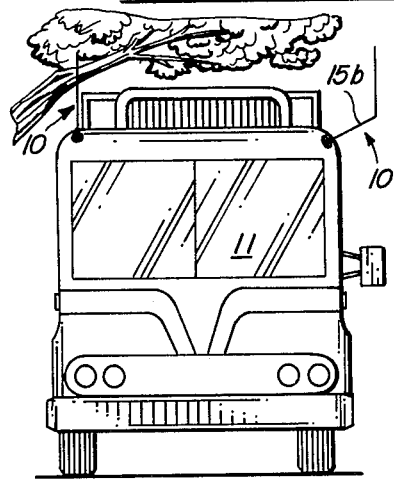
FIG. 6 is a front elevational view of a vehicle with embodiments of the present invention mounted thereon.
Figure 7:
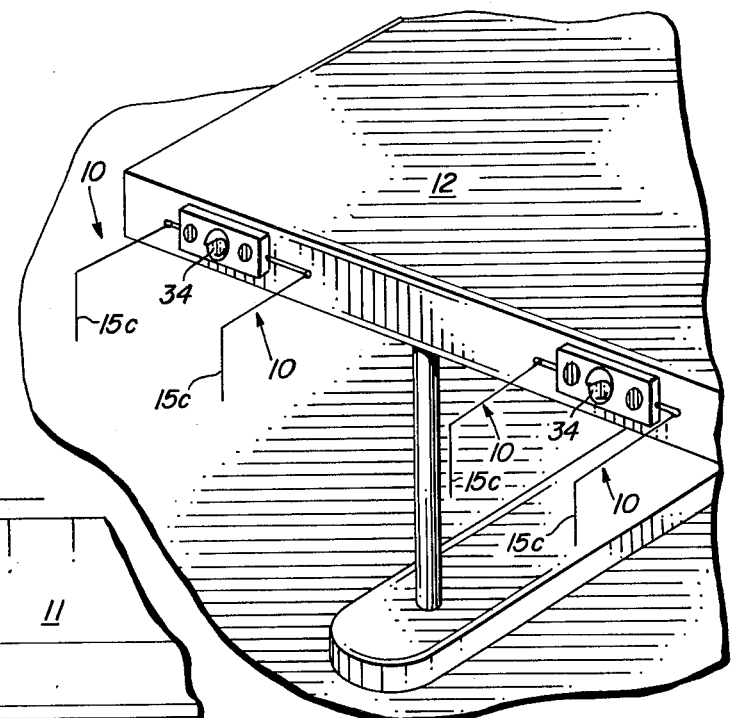
FIG. 7 is a perspective view of a building construction with embodiments of the present invention mounted thereon.
Figure 8:
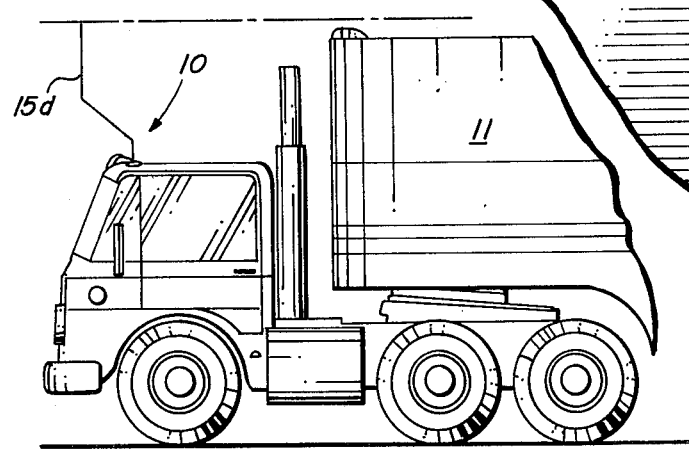
FIG. 8 is a side elevational view of a vehicle with an embodiment of the present invention mounted thereon.

Briefly, in accordance with my invention, I provide an improved clearance detecting device mountable on vehicles and on constructions under and by which the vehicles pass, to warn the driver of a vehicle of an impending collision between said vehicle and said construction. The detector generally includes a base, an antenna deflectable on contacting a vehicle or on contacting a construction, elongate spring means, laterally deflectable from a normally generally linear position, for attaching the antenna to the base, and an electrical circuit having an alarm device and normally open switch means, the switch means being responsive to close when the antenna is contacted and deflected.

The improvements in this general type of vehicle clearance detector which are comprehended by the present invention include switch means comprising a contact surface in the electrical circuit, and elongate flexible means normally generally parallel to the spring means and having a pair of ends. One of the ends, i.e., either the upper or the lower end, is attached to the clearance detector device.

One of the pair, i.e., either the upper or the lower end, is responsive when the antenna is deflected to engage the contact surface so that the electrical circuit is closed and the alarm device is activated.

Turning now to the drawings, which depict the presently preferred embodiments of the invention for the purpose of illustrating the practice thereof and not by way of limitation of the scope of the invention, FIG. 1 illustrates vehicle clearance detectors 10 mounted on a vehicle 11 approaching an awning 12 positioned over fuel pump 13.

FIGS. 2 and 3 illustrate a vehicle detector device 10 incorporating the presently preferred embodiment of the invention. The detector 10 includes an antenna 15 received by an aperture 16 in an electrically insulating cap 17. The threaded screw 18, received by the internally threaded aperture 19, is tighted to security antenna 15 in the cap 17. The cap 17 engages the upper end of a spring 20. The lower end of spring 20 engages a base 21.

The base 21 is comprised of an inverted cylindrical housing 21a attached to a circular disc 21b provided with apertures 22 which receive threaded mounting screws 22a. The disc 21b is further provided with aperture 14.

The cylindrical housing 21a is provided with an aperture 23 and an upright cylindrical cap 24 having an aperture 25. Apertures 25, 23, 16 and 14 are all concentric to the verticle axis drawn through the respective centers of said apertures.

A spring 26 with integrally formed upper 27 and lower 28 ends is mounted inside of and concentric with spring 20. Threaded screw 29, received by the internally threaded aperture 30 in the cap 17 secures the upper end 27 of the spring 26 in the aperture 16. The lower end 28 of the spring is centered in apertures 23 and 25.

An electrical circuit 31 is provided with an on/off switch 32, a battery 35, an audio alarm 33 and visual alarm 34. The circuit is connected to the lower end 28 of spring 26 and the base 21 by, respectively, leads 37 and 36.

In operation, with the switch 32 in the "on" position, the antenna 15 is deflected on contacting an obstruction. As the antenna is deflected, the lower end 28 of spring 26 moves laterally into contact with the surface of the aperture 25. When the end 28 contacts the aperture 25, the electrical circuit 31 is closed, and electricity travels from lead 37 through end 28 and the base 21 to lead 36 activating the alarms 33 and 34.

As shown in FIG. 4, the cylindrical housing 21a may optionally be provided with a U-shaped mounting bracket 38. The bracket 38 includes the internally threaded aperture 39 which receives the threaded thumb screw 40.

FIGS. 5–8 illustrate alternate embodiments of the clearance detector 10 affixed to vehicles 11 and to an awning 12. The embodiments differ according to various alternative antenna constructions 15a–15d.

Figure 9:
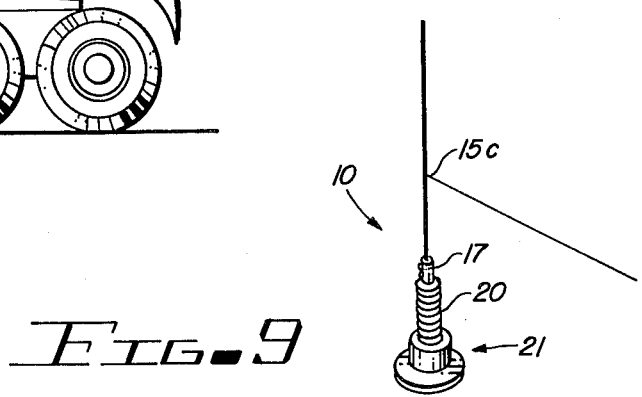
FIG. 9 is a perspective view of an alternate embodiment of the present invention.

In FIG. 9 another embodiment of the clearance detector 10 with the alternative antenna construction is shown.

As earlier described the spring 26 and its integrally formed ends 27 and 28, as illustrated in FIG. 3, acts as a switch mechanism which closes the circuit 31 and activates the alarms 33 and 34 when the antenna 15 is deflected. The spring "switch" 26, because of its ability to be displaced with and bend with the concentric spring 20, provides a switch mechanism of long-lasting durability and of simple and inexpensive manufacture.

Having described my invention in such clear, concise and exact terms as to enable those skilled in the art to understand and practice it, and having described the presently preferred embodiments thereof, I claim:

1. In a clearance detecting device for warning the driver of a vehicle of an impending obstruction, including (a) a base adapted for attachment to an existing structure;

(b) an antenna for contacting said obstruction;

(c) primary spring means, laterally deflectable from a normally generally linear position, for attaching said antenna to said base, and (d) an electrical circuit having an alarm device and normally open switch means, said switch means responsive to close and activate said circuit when said antenna is contacted and deflected by said obstruction, the improvements in said clearance detecting device which permit deflection of said antenna in any direction through an arc of at least 90° and in which said switch means comprises, (a) a contact surface mounted in said base and included in said circuit, and (b) elongate spring means normally generally parallel along the length thereof to said primary spring means and having a pair of ends, (i) a first end attached to said clearance detector device, and (ii) means mounting said first end to said primary spring means, and (iii) a substantially free end of said elongate spring means responsive when said antenna is deflected to engage said contact surface so that said circuit is closed and said alarm device is activated.

* * * * *